United States Patent
Ko et al.

(10) Patent No.: US 7,039,578 B2
(45) Date of Patent: May 2, 2006

(54) METHOD AND APPARATUS FOR TRAINING FOREIGN LANGUAGES

(75) Inventors: Yoon-Yong Ko, 202/1101 Kumbo apt., Bongsun 2-dong, Nam-gu, Kwangju, 503-062 (KR); Sang-Hyun Bae, Kwangju (KR)

(73) Assignee: Yoon-Yong Ko, Kwangju (KR)

( * ) Notice: Subject to any disclaimer, the term of this patent is extended or adjusted under 35 U.S.C. 154(b) by 740 days.

(21) Appl. No.: 09/926,822

(22) PCT Filed: Apr. 24, 2001

(86) PCT No.: PCT/KR01/00680

§ 371 (c)(1),
(2), (4) Date: Dec. 26, 2001

(87) PCT Pub. No.: WO01/82040

PCT Pub. Date: Nov. 1, 2001

(65) Prior Publication Data

US 2002/0169612 A1    Nov. 14, 2002

(30) Foreign Application Priority Data

Apr. 25, 2000 (KR) ............................... 2000-22028

(51) Int. Cl.
*G01L 17/20* (2006.01)
(52) U.S. Cl. ........................ 704/8; 704/270; 434/157
(58) Field of Classification Search ............... 704/270, 704/1, 2, 3, 9
See application file for complete search history.

(56) References Cited

U.S. PATENT DOCUMENTS

| | | | | |
|---|---|---|---|---|
| 4,611,996 A | * | 9/1986 | Stoner | 434/202 |
| 5,697,789 A | * | 12/1997 | Sameth et al. | 434/157 |
| 6,017,219 A | * | 1/2000 | Adams et al. | 434/178 |
| 6,206,700 B1 | * | 3/2001 | Brown et al. | 434/116 |

FOREIGN PATENT DOCUMENTS

| KR | 1998-0004868 | 3/1998 |
|---|---|---|
| KR | 1998-061663 | 10/1998 |
| KR | 1999-000798 | 1/1999 |
| KR | 1999-0030683 | 5/1999 |

* cited by examiner

*Primary Examiner*—Talivaldis Ivars Smits
*Assistant Examiner*—Minerva Rivero
(74) *Attorney, Agent, or Firm*—Armstrong, Kratz, Quintos, Hanson & Brooks, LLP

(57) ABSTRACT

The present invention relates to a foreign language training apparatus and the method. The purpose of the invention is to provide a foreign language training apparatus and the method that can enhance the efficiency of studying foreign languages.

The invention provides the apparatus comprising: storage including a plurality of multimedia files for learning foreign languages and a program for executing the multimedia files; a checking means for checking executing time of the multimedia files; an input for inputting a control signal; a controller that selects a first file of the group of files from the storage, executes the first file using the program, selects and executes a second file after a predetermined time dependent on the executing time of the first file checked by the checking means according to the control signal; and an output for outputting the executed multimedia files.

4 Claims, 2 Drawing Sheets

[FIG. 1]
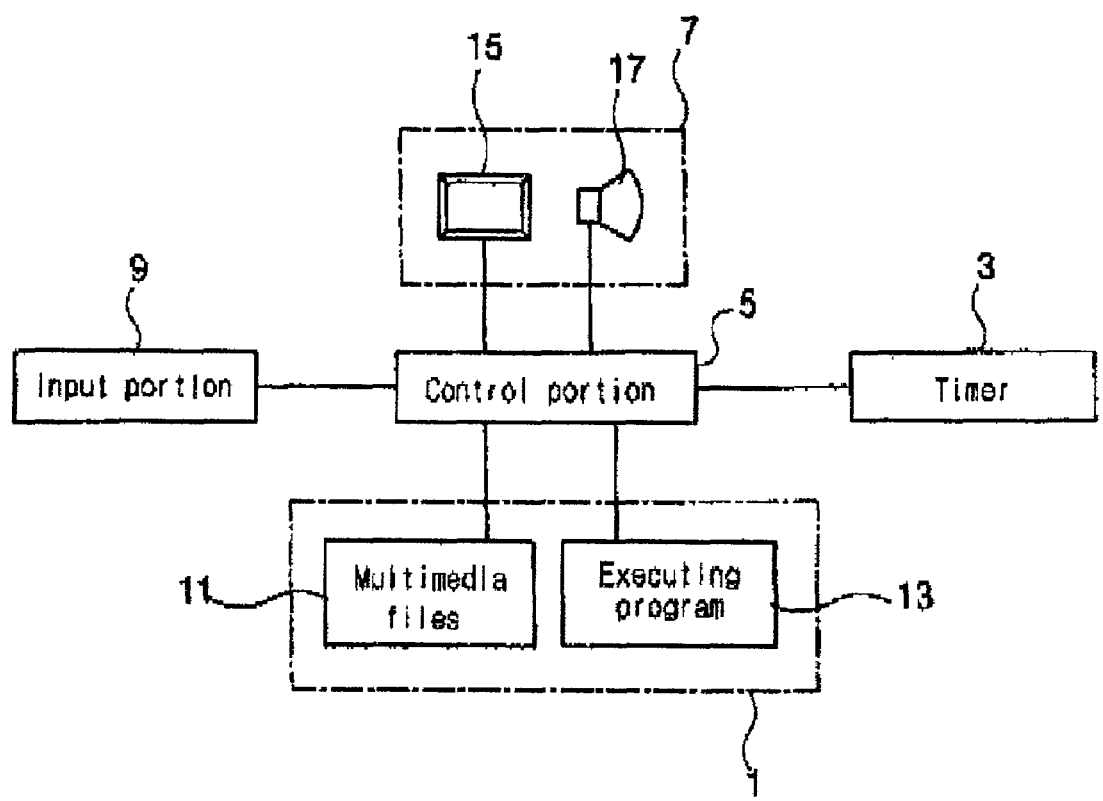

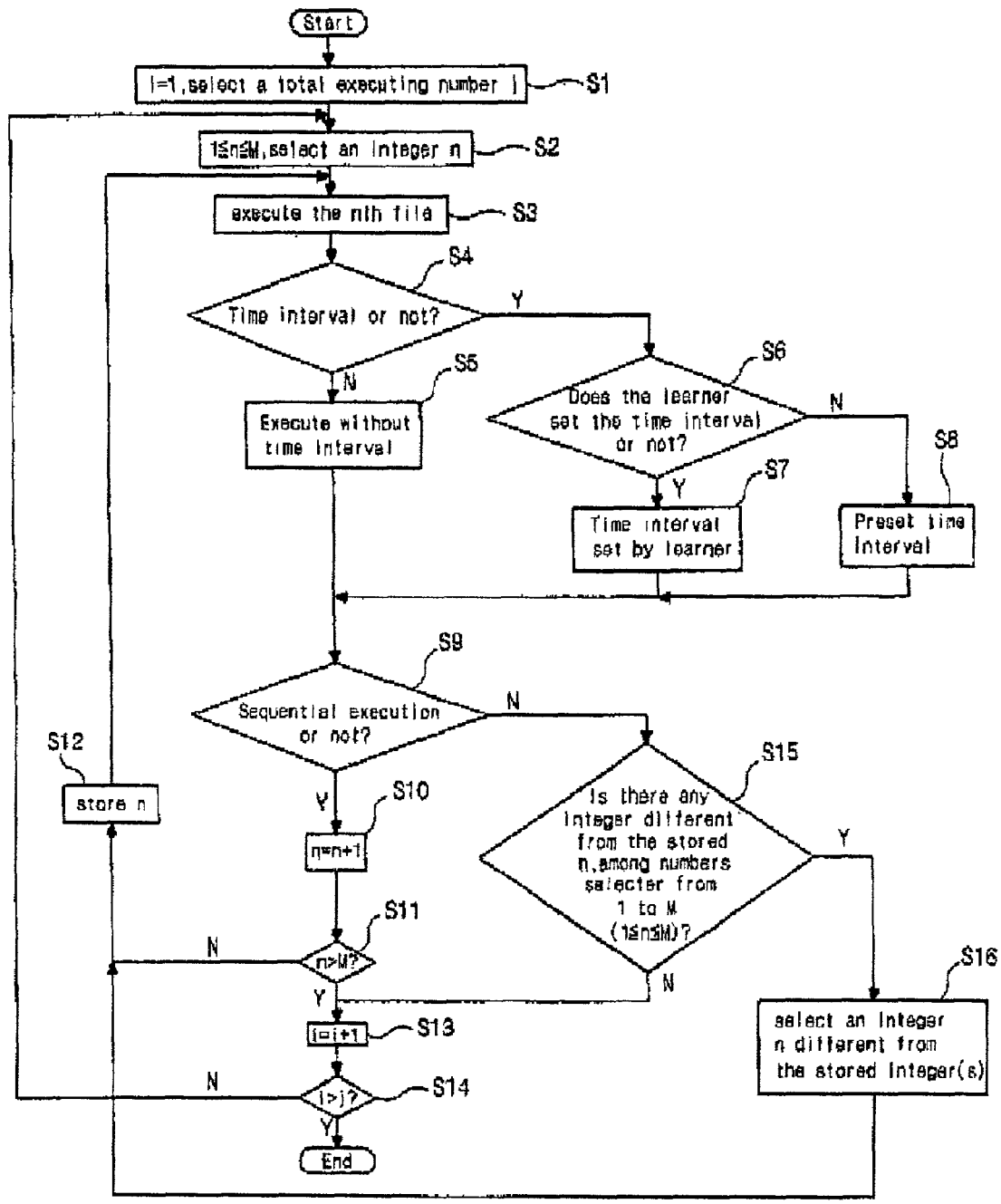
[FIG. 2]

METHOD AND APPARATUS FOR TRAINING FOREIGN LANGUAGES

BACKGROUND OF THE INVENTION

1. Field of the Invention

This invention relates to a method and an apparatus for training in foreign languages, and more specifically to the foreign language-training method and apparatus using a computer or a multimedia device.

2. Description of the Related Art

As world communication and transport technologies develop, interchange among nations rapidly rises regardless of each nation's territory. Therefore, each nation has recently become more concerned about interchange of conversation with other nations. English, Japanese, French, and German are mainly used as common and business languages for the global community. As a result, other nations endeavor to learn these commonly used languages.

The present invention relates to a language training method and an apparatus thereof that have been developed to satisfy the above-mentioned need for learning foreign languages. A cassette tape recorder, a video, or a CD (compact disk) player is conventionally used for the language learning method, and a telephone or an internet-aided language instruction system has been used recently for an improved language learning method.

Each of the above-mentioned conventional methods usually provides a set of trained speech models for learners to practice speaking during a predetermined time. In the conventional methods, the length of the speech model composed in a foreign language is not limited, but a time interval for the learner to practice the speech model is predetermined as a definite time, for example, 8 seconds. The predetermined time interval is too short for the learner to practice a long sentence, or is too long for the learner to practice a short sentence, thereby making the learner bored and deteriorating efficiency of the training.

In another aspect, no language training apparatus is suggested to control training speed depending on each learner's attainment for the training as well as one's ability.

Further, in the conventional methods, the set of trained speech models is sequentially repeated such that the learner practices each speech model in the same order, or questions are sequentially asked for the learner of a foreign language such that the learner answers each of them in the same order. However, the above-mentioned techniques make the learner bored, and experienced learners who remember the sequence of conversation or questions may remind a next question or sentence, thereby deteriorating effects of training.

In another aspect, the ability to interpret is important for international trade relations and training therefore is effective for learning a foreign language. However, there exists no language training method and apparatus for training learners to interpret.

SUMMARY OF THE INVENTION

Accordingly, the present invention is contrived to overcome the above-mentioned problems of the conventional art. It is all object of the present invention to provide a foreign language training method and an apparatus thereof that enhance the efficiency of learning foreign languages.

To achieve the above-mentioned object, the present invention provides a foreign language training apparatus, which includes: a storage portion storing a plurality of language lesson multimedia files and a program used for executing the multimedia files; a means for checking executing time of the multimedia files; a control portion that, depending on input control signals, selects a first file among the plurality of files stored in the storage portion, executes the first file using the program stored in the storage portion, executes a second file different from the first file after a time passes in accordance with the first file executing time checked by the checking means; a multimedia output portion outputting the executed multimedia files depending on an output control signal applied from the control portion; and an input portion inputting the input control signals to the control portion.

The above-mentioned multimedia files are motion picture files or image files both including voice files. Native language voice files are preferably selected for the sake of better interpretation training or translation training, though foreign language voice files can be selected.

The present invention has a characteristic of detecting time information of the multimedia files and setting a time interval on the basis of the time information.

The present invention provides a foreign language training method using a multimedia having a plurality of language lesson multimedia files, the method including: a step of executing a first file of the plurality of multimedia files using the multimedia; a step of checking the executing time of the first file; and a step of executing a second file using the multimedia after a time passes in accordance with the checked executing time.

It is preferred for the above-mentioned method that an executing file is randomly selected among the plurality of multimedia files without repetition until all the files are executed. After each of the files is executed once, all the files are preferably repeated depending on a user's request.

BRIEF DESCRIPTION OF THE DRAWINGS

FIG. 1 is a block diagram of the present invention.
FIG. 2 is a flow chart showing a foreign language training method of the present invention.

DETAILED DESCRIPTION OF THE EXEMPLARY EMBODIMENTS

Referring now to the drawings, the present invention is explained in detail.

FIG. 1 is a block diagram showing a conceptual configuration of a foreign language training apparatus according to a first preferred embodiment of the present invention. As shown, the apparatus according to the first preferred embodiment includes: a storage portion (1) having a plurality of language lesson multimedia files (11) and a program (13) executing the multimedia files; a timer (3) checking executing time of the multimedia files; a control portion (5) that, depending on input control signals, executes a first file selected among the plurality of files (11) stored in the storage (1), orders the tinier (3) to check the executing time of the first executed file, and executes a second file that is different from the first file after a time passes in accordance with a first file executing time checked by the timer (3); a multimedia output portion (7) outputting the executed multimedia files depending on an output control signal applied from the control portion (5); and an input portion (9) inputting the input control signals to the control portion (5).

The multimedia files (11) stored in the storage portion (1) are motion picture files including voice files. Foreign language lesson data is stored in the multimedia files, and the foreign language lesson data is preferably composed in a native language to enable training in interpretation or translation. The above-mentioned data may be loaded in the apparatus according to the preferred embodiment via a CD ROM (compact disc read only memory) or a communication network such as the internet. That is to say, the storage portion (1) of the apparatus may be the CD ROM or a RAM (random access memory) mounted in the apparatus.

In addition, the program (13) is an executing program for a motion picture file or a voice file. The Media Player produced by Microsoft of the U.S.A. may be selected for the program (13).

A switch, a slider, a mouse, or a joystick may be selected for the input portion (9) inputting the input control signals to the control portion.

The control portion (5) receives the input control signal from the input portion (9) and executes the multimedia files (11) stored in the storage portion (1). That is to say, after executing the first file, the control portion (5) gets information about the executing time of an executed multimedia file from the timer (3) or directly reads time information of the multimedia file. After a time interval passes in accordance with the first file's executing time designated by a control signal, the control portion (5) executes a second file. Then, the control portion (5) makes the executed files output via the multimedia output portion (7), which is a monitor (15), a speaker (17), or the like.

The multimedia files (11) stored in the storage portion (1) may be sequentially or randomly selected by the control portion (5). If the file is randomly selected, it is efficient for the foreign language training method according to the present invention that all the multimedia files (11) are selected preferably without repetition.

As mentioned above, the executing time of the multimedia file is measured when the file is executed in the control portion (5), or it is read from the time information of each file. At this point, the executing time serves as a standard value (100%) of the time interval, such that the time interval is adjusted with respect to the executing time. That is to say, the time interval can be variously set to 150%, 140%, . . . , 80%, or 70%, et al. of the executing time depending on the learner's ability. For example if the learner starts the language training for the first time, the time interval may be set to 130% of the executing time such that the training proceeds with relatively low speed. Then, to improve the learner's fluency in speaking, the time interval may gradually decrease to 70% of the executing time such that the training proceeds with relatively high speed.

In addition, the learner himself can manually determine the time interval. In that case, the input portion (9) such as the switch, arrow keys of a keyboard, or buttons of a mouse is used to set the time interval.

FIG. 2 is a flow chart showing the foreign language training method according to the second preferred embodiment of the present invention. In "S1", at first, a total executing number "j", which is the number of times of repeating a set of the total files, is determined depending on a user's decision, and a total executed number "i" is initialized to 1. After the total executing number is determined, an integer "n" is selected from numbers 1 to "M" ("M" is the number of multimedia files to execute) in "S2", and the selected number of files are executed in "S3".

After the files are executed, whether the user, the learner, wants to have a time interval or not is determined in "S4". If the time interval is not selected, the training proceeds without the time interval in "S5". If the time interval is selected, whether the user set a condition of the time interval or not is determined in "S6". Then, if the user set the condition, the time interval is applied in accordance with the condition, in "S7". If the user does not set the condition, the time interval is applied in accordance with a preset condition, in "S8". For example, the same time interval as the executing time of the file may be applied.

Thereafter, whether the multimedia files are sequentially or randomly executed is determined in "S9".

In case of the sequential execution, a next integer "n+1" is designated for the integer "n" in "S10", and whether the newly designated integer is larger than "M", which is the number of files, or not is determined in "S11". If the newly designated integer is not larger than "M". The newly designated integer "n" is stored in "S12" and the flow returns to "S3" of executing a file. If the newly designated integer is larger than "M", it means tat all the files are respectively executed. Therefore, the total executed number "i" is increased by 1 in "S13", and whether the total executed number "i" increased is larger than the total executing number "j" or not is determined in "S14". If the total executed number "i" increased is larger than. "j", because the needed repetition is completed, the flow is stopped. If "i" is not larger than "j", however, the flow returns to "S2" of selecting the integer.

In case of the random execution, whether any integer selected from 1 to "M" but not stored in the step of "S10" exists or not is determined in "S15". If some integers exist, one integer is selected from them in "S16" and stored in the step of "S12" which that the flow proceeds again. If there is no integer different from the integers stored in the step of "S12", it means that there exists no files not executed or all the files are respectively executed. Therefore, the total executed number "i" increased by 1 in "S13", and whether the total executed number "i" increased is larger than the total executing number "j" or not is determined in "S14". If the total executed number "i" increased is larger than "j", because the needed repetition is completed, the flow is stopped. If "i" is not larger than "j", however, the flow returns to "S2" of selecting the integer.

Although exemplary embodiments according to the present invention were explained, they are just examples of the present invention and the present invention is not limited to the preferred embodiments.

For example, before the steps in connection with the time interval proceed, a step of providing an orally narrated fairy tale may be added.

In addition, the multimedia files adopted for the present invention may be provided via a slide.

However, those modification and variation are disclosed by the present invention, because they come within the scope of the appended claims of the present invention.

INDUSTRIAL APPLICABILITY

In the present invention, the time interval is designated depending on the length of sentence or conversation composed in a foreign language such that the learner can learn the foreign language with a higher efficiency. In addition, because the learner can select a proper time interval and a proper training speed, the training corresponds to the learner's ability and attainment.

Further, because the random execution as well as the sequential execution is performed, all experienced learner who experiences the training a plurality of times can avoid problems in the next situation.

Furthermore, when the multimedia files composed in a native language are executed, the learner can properly exercise interpretation skills, which serves as important training method to learn a foreign language.

This invention claim is:

1. A foreign language training apparatus comprising:
   a storage portion storing a plurality of language lesson multimedia files and a program used for executing the multimedia files;
   a checking means for checking executing time of the multimedia files;
   a control portion that, depending on input control signals, selects a first file among the plurality of files stored in the storage portion, executes the first file using the program stored in the storage portion, and executes a second file that is different from the first file after a time interval elapses;
   a multimedia output portion, outputting the executed multimedia files depending on an output control signal applied from the control portion; and
   an input portion inputting the input control signals to the control portion,
   wherein the time interval is adjusted in accordance with a predetermined proportion to the first file executing time checked by the checking means, and
   wherein the predetermined proportion is manually selected via the input portion.

2. The foreign language training apparatus of claim 1, wherein the multimedia files are voice files composed in a native language or motion picture files including the voice files.

3. A foreign language training method using a multimedia having a plurality of language lesson multimedia files, the method including:
   a step of executing a first file of the plurality of multimedia files using the multimedia;
   a step of checking the executing time of the first file; and
   a step of executing a second file using the multimedia after a time interval elapses,
   wherein the time interval is adjusted in accordance with a predetermined proportion to the first file executing time checked by the checking means, and
   wherein the predetermined proportion is manually selected via the input portion.

4. The foreign language training method of claim 3, wherein an executing file is randomly selected among the plurality of multimedia files without repetition until all the files are executed.

* * * * *